Nov. 7, 1967 V. O. SCHMITZ ET AL 3,351,139
PLOW COLTER
Filed May 11, 1966
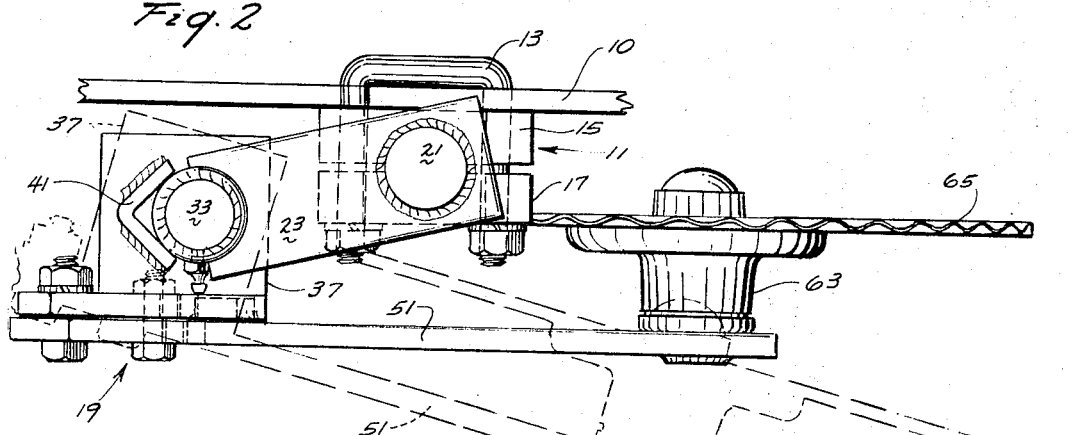
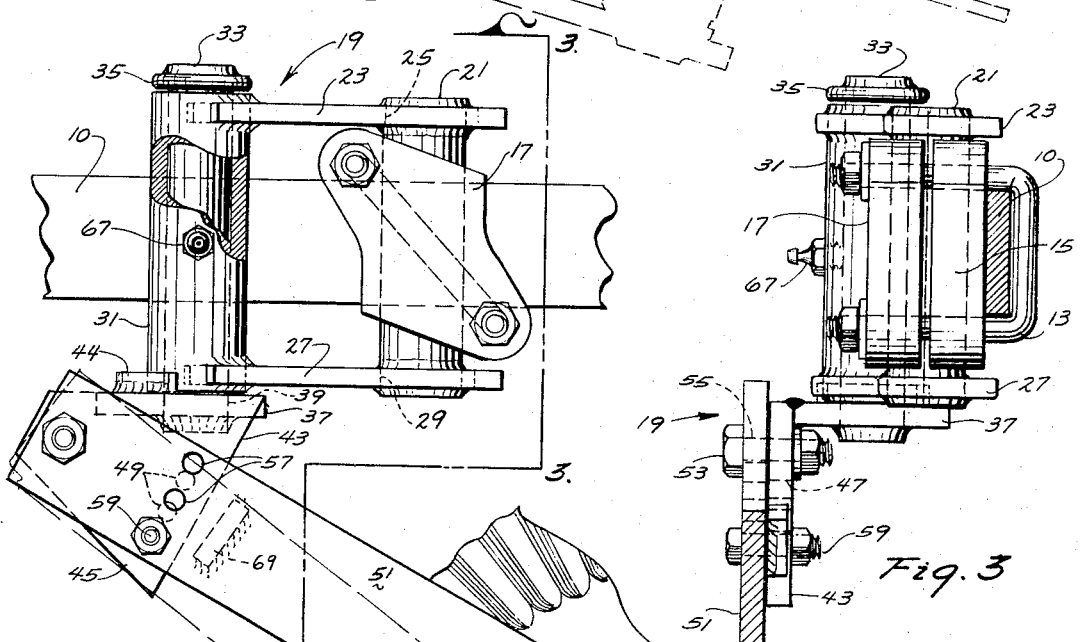
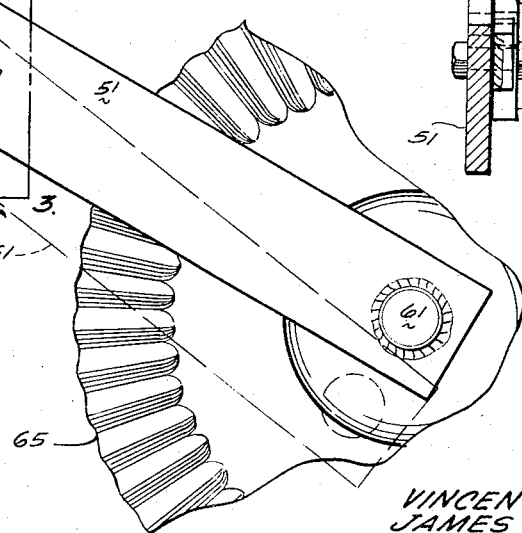
INVENTOR.
VINCENT O. SCHMITZ
JAMES E. SCHMITZ
BY
ATTORNEYS

United States Patent Office 3,351,139
Patented Nov. 7, 1967

3,351,139
PLOW COLTER
Vincent O. Schmitz and James E. Schmitz, both of
Rte. 1, Clear Lake, Iowa 50428
Filed May 11, 1966, Ser. No. 549,208
6 Claims. (Cl. 172—602)

ABSTRACT OF THE DISCLOSURE

A plow colter comprising, a vertically disposed first shaft adapted to be operatively connected to a plow beam, a second shaft spaced from said first shaft and being rotatably mounted in a bearing means, and a disc support arm operatively selectively pivotally secured to said second shaft.

---

This is a continuation-in-part application of the application, Ser. No. 370,779, filed May 28, 1964, now abandoned.

Plow colters have long been used to cut the ground in advance of the plow share. These colters are usually attached to a plow beam and extend downwardly therefrom. When the plow is being used in an area of long straw, weeds, cornstalks or the like, the colters frequently become plugged.

The plow colters also have a tendency to break or bend when the disc member of the colter strikes a foreign object. Additionally, the conventional plow colters do not provide a means for conveniently adjusting the depth of the disc member secured thereto.

The plow colters presently available likewise do not provide a means for quickly and conveniently laterally adjusting the plow colter with respect to the plow share. Also, the plow colters now available are extremely difficult to adjust vertically in that the plow colter falls from the beam clamp when the same is loosened. A further disadvantage in the plow colter is that they must be fabricated to be secured to a particular type of plow.

Therefore, it is a principal object of this invention to provide a plow colter which will not become plugged with foreign material.

A further object of this invention is to provide a plow colter having a shear pin means mounted thereon to prevent damage to equipment upon the striking of a foreign object and which also serves as a means for adjusting the depth of the disc member.

A further object of this invention is to provide a plow colter which may be readily secured to a variety of plows regardless of make or type.

A further object of this invention is to provide a plow colter which permits horizontal and vertical adjustment thereof with respect to the plow share.

A further object of this invention is to provide a plow colter which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a side view of the plow colter secured to the horizontal plow beam;

FIG. 2 is a top view of the plow colter; and

FIG. 3 is a sectional view as would be seen on line 3—3 of FIG. 1.

The numeral 10 generally designates a horizontal beam of a conventional plow. A conventional colter clamp 11 is secured to beam 10 by a U-bolt 13 and is comprised of clamp members 15 and 17.

The plow colter of this invention is generally designated by the reference numeral 19 and is detachably secured to beam 10 by means of clamp 11 as seen in the drawings. The numeral 21 refers to a vertically disposed shaft having reduced diameter portions at its upper and lower ends. A bar 23 having an opening 25 formed therein is secured to shaft 21 by means of the upper reduced diameter portion thereof being received by opening 25 and being welded as seen in FIG. 1. A bar 27 having an opening 29 formed therein is secured to the lower end of shaft 21 by means of the lower reduced diameter portion thereof being received by an opening 29 and being welded therein as also illustrated in FIG. 1. The other ends of bars 23 and 27 are each provided with a semi-circular cut-out portion which is adapted to receive the portion of a hollow bearing 31. Bars 23 and 27 are secured to hollow bearing 31 by means of welding or the like. A vertically disposed shaft 33 is rotatably mounted in bearing 31 and is prevented from downward movement with respect thereto by means of a ring 35 welded to the exposed upper end thereof. A rub plate 37 is secured to the exposed lower end of shaft 33 by means of opening 39 which is formed in rub bar 37 being received by the lower end of shaft 33 and being welded therein. An upstanding V-shaped stop means 41 is welded to the upper surface of rub plate 37 adjacent the forward end thereof as best seen in FIG. 3. It can be seen in FIG. 2 that the free ends of stop means 41 will engage the end of bar 27 to limit the rotational movement of shaft 33 with respect to bearing 31 in two directions.

A plate member 43 is welded to one side of rub plate 37 and has a downwardly tapered forward portion 45. Plate 45 is provided with a threaded opening 47 formed therein adjacent its upper forward end. Plate 43 is provided with a plurality of openings 49 formed therein adjacent its lower rearward end as illustrated in FIG. 1.

A disc support arm 51 is selectively pivotally secured to plate member 43 by means of a bolt 53 extending through an opening 55 in the upper end of arm 51 and being received by opening 47 in plate member 43. Arm 51 is provided with a plurality of openings 57 formed therein between the ends thereof. Openings 57 are adapted to register with various of the openings 49 and a shear pin 59 extends therethrough. A spindle 61 is received by a suitable opening in the lower end of arm 51 and is welded therein as illustrated in FIG. 1. A conventional hub means 63 is rotatably mounted on spindle 61 and has a disc member 65 operatively secured thereto. Hub means 63 should be of the sealed type to prevent dust from entering therein. Additionally, bearing 31 should have a suitable grease fitting 67 provided thereon.

Colter 19 is mounted in clamp 11 by simply removing U-bolt 13 and causing clamp members 15 and 17 to embrace shaft 21 between bars 23 and 27. U-bolt 13 is then extended through clamp members 15 and 17 and secured to plow beam 10. Preferably, the length of shaft 21, that is, the distance between bars 23 and 27, should be somewhat greater than the vertical height of clamp 11 to permit vertical adjustment of the plow colter with respect to the clamp 11. Shaft 21 may be selectively rotated with respect to clamp 11 at times to permit the lateral movement of the plow colter to properly align the disc member 65 with the plow share mounted on the plow. When shaft 21 has been rotated to its desired position with respect to clamp 11, U-bolt 13 is tightened to prevent further rotational movement therebetween. If subsequent rotational or vertical adjustment between shaft 21 and clamp 11 is necessary, U-bolt 13 need be simply loosened and the adjustment performed. It can be appreciated that upon the loosening of clamp 11, shaft 21 has a tendency to move downwardly with respect thereto. In conventional plow colters, the mounting shaft simply falls from the beam clamp upon the loosening thereof. However, in this invention, downward movement of shaft 21 is prevented by bar 23 engaging the upper end of clamp 11 which prevents the plow colter from falling from the plow beam.

Stop means 41 limits the rotational movement in two directions of shaft 33 with respect to bearing 31 due to the engagement of the forward ends of stop means 41 with the projecting forward ends of bar 27. Stop means 41 prevents undesired wobbling of the plow colter with respect to the plow beam.

When the disc member 65 or various other structure of the plow colter strikes a foreign object such as a rock or the like, damage is prevented thereto by the ability of shear pin 59 to shear which will permit the arm 51 and disc member 65 to pivot upwardly with respect to plate 43. Shear pin 59 not only prevents damage to the associated equipment but also permits the depth adjustment of disc member 65 due to the provision of the plurality of openings 49 in plate 43 and plurality of openings 57 in arm 51.

The upper end of arm 51 terminates closely adjacent the lower end of shaft 33 and therefore provides as much clearance for the plow colter as is present in the plow itself. Because the upper end of arm 51 and plate 43 are positioned so closely to horizontal plow beam 10, long weeds, corn-stalks, and the like will not become entangled therewith. The plow colters presently available do not provide the needed clearance and are constantly becoming plugged which result in much "down" time. Additionally, the downwardly tapered forward end 45 of plate 43 also insures that the plow colter will have the required clearance and that any foreign material coming into contact therewith will be easily moved downwardly and rearwardly therefrom.

The plow colter 19 is extremely durable in use for several reasons, The substantial length of bearing 31 and shaft 33 creates a large bearing surface therebetween which dissipates the strain over a large surface to prevent any twisting or damage to the mounting means. The long bearing means also insures that the plow colter will caster easily. The upper surface of rub plate 39 engages the lower end of bearing 31 to limit the upward movement of shaft 33 with respect to bearing 31.

The design of plow colter 19 is such that it may be quickly and easily secured to any make or type of plow.

Stop means 69, which is welded to arm 51, is adapted to engage the rearward end of plate 43 at times to limit the pivotal movement of arm 51 with respect to plate 43 in two directions.

Thus it can be seen that the device accomplishes at least all of its stated objectives.

Some changes may be made in the construction and arrangement of our plow colter without departing from the real spirit and purpose of our invention, and it is our intention to cover by our claims, any modified forms of structure or use of mechanical equivalents which may be reasonably included within their scope.

We claim:
1. In a colter for a plow having a horizontal beam and a clamp means detachably secured to said beam,
   a vertically disposed first shaft adapted to be received by the clamp means and being selectively rotatably mounted therein,
   a vertically disposed hollow bearing means operatively secured to said shaft and spaced therefrom,
   a vertically disposed second shaft rotatably mounted in said bearing means and having its lower end extending from the lower end thereof,
   a plate member operatively secured to said second shaft,
   a disc support arm selectively pivotally secured to said plate and extending downwardly and laterally therefrom,
   the upper end of said disc support arm terminating closely adjacent the beam of the plow thereby preventing foreign material from becoming entangled with the colter,
   said disc support arm having a rotatable hub means secured to its lower end adapted to receive a disc means thereon,
   said first shaft and hollow bearing means being interconnected by first and second spaced bars extending therebetween.

2. The colter of claim 1 wherein a rub plate is secured to the lower end of said second shaft, said plate member being secured to said rub plate, a stop means secured to said rub plate adapted to engage one of said first and second bars to limit the rotational movement of said second shaft with respect to said hollow bearing means at times.

3. The colter of claim 2 wherein said stop means is comprised of a V-shaped member having spaced apart free ends, the free ends of said V-shaped member adapted to engage opposite sides of said one bar at times to limit the rotational movement of said second shaft in two directions with respect to said hollow bearing means.

4. The colter of claim 1 wherein the length of said first shaft is greater than the vertical height of the clamp to permit vertical adjustment of the colter with respect to the clamp.

5. The colter of claim 1 wherein said first and second bars extend over the top and beneath the bottom of the clamp respectively.

6. The colter of claim 1 wherein a stop means is secured to disc support arm which is adapted to engage said plate member at times to limit the pivotal movement of said disc support arm with respect to said plate member.

References Cited
UNITED STATES PATENTS

| | | | |
|---|---|---|---|
| 436,478 | 9/1890 | Hirshheimer | 172—602 |
| 801,961 | 10/1905 | Balmer | 172—602 |
| 1,244,714 | 10/1917 | Dickinson | 172—144 |
| 1,526,586 | 2/1925 | Becker | 172—602 |
| 3,115,192 | 12/1963 | Bushmeyer | 172—166 |

ABRAHAM G. STONE, *Primary Examiner.*

WILLIAM A. SMITH III, *Examiner.*

A. E. KOPECKI, *Assistant Examiner.*